(12) United States Patent
Otake

(10) Patent No.: US 8,259,368 B2
(45) Date of Patent: Sep. 4, 2012

(54) IMAGE PROCESSING APPARATUS AND ITS METHOD

(75) Inventor: Ritsuko Otake, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1623 days.

(21) Appl. No.: 11/370,025

(22) Filed: Mar. 8, 2006

(65) Prior Publication Data

US 2006/0232800 A1 Oct. 19, 2006

(30) Foreign Application Priority Data

Mar. 30, 2005 (JP) .................................. 2005-099417

(51) Int. Cl.
*H04N 1/46* (2006.01)
(52) U.S. Cl. ...................................................... 358/500
(58) Field of Classification Search .................. 358/500, 358/537, 539
See application file for complete search history.

(56) References Cited

U.S. PATENT DOCUMENTS

| | | | | |
|---|---|---|---|---|
| 5,337,069 | A | 8/1994 | Otake et al. | 345/123 |
| 5,455,603 | A | 10/1995 | Hori et al. | 346/134 |
| 5,495,266 | A | 2/1996 | Otake et al. | 345/123 |
| 6,307,638 | B1 * | 10/2001 | Matsumoto | 358/1.12 |
| 6,618,167 | B1 * | 9/2003 | Shah | 358/1.15 |
| 6,674,547 | B1 | 1/2004 | Kadowaki | 358/3.01 |
| 6,868,183 | B1 * | 3/2005 | Kodaira et al. | 382/203 |

FOREIGN PATENT DOCUMENTS

| | | |
|---|---|---|
| EP | 0665677 A | 2/1995 |
| EP | 0723362 A | 7/1996 |
| EP | 0822709 A | 4/1998 |
| JP | 6-320802 | 11/1994 |
| JP | 8-195878 | 7/1996 |
| JP | 10-243229 | 9/1998 |
| JP | 11-115281 | 4/1999 |
| JP | 3023374 | 1/2000 |
| JP | 2004-330688 | * 11/2004 |
| KR | 1991-002606 | 2/1991 |
| KR | 1992-0005611 | 3/1992 |

OTHER PUBLICATIONS

Japanese Official Communication dated Sep. 28, 2009, regarding Application No. 2005-099417.

* cited by examiner

*Primary Examiner* — Benny Q Tieu
*Assistant Examiner* — Jeremiah Bryar
(74) *Attorney, Agent, or Firm* — Fitzpatrick, Cella, Harper & Scinto

(57) ABSTRACT

When attribute information cannot be generated from received data, image processing methods and image processing parameters are set unequivocally independently of the received data. If the same image processing methods and image processing parameters are set, processing that does not match the purpose of output or user's favor in terms of image quality may be executed. Hence, if the received data is not PDL data and does not include any interpretable attribute information, a reception print mode is checked. If "character priority" is selected for the reception print mode, attribute flag data of a character attribute is generated. If "photo priority" is selected, attribute flag data of a photo attribute is generated. If "auto" is set, automatic generation of attribute flag data is performed. When attribute flag data cannot be generated, detailed settings are checked to generate attribute flag data of a character attribute or photo attribute.

6 Claims, 16 Drawing Sheets

| FORMAT | ATTRIBUTE |
|---|---|
| MMR COMPRESSED TIFF | MONOCHROME TEXT |
| JPEG COMPRESSED GRAYSCALE | GRAYSCALE PHOTO |
| JPEG COMPRESSED COLOR | COLOR PHOTO |
| OTHER | COMPLIANT TO PRIORITY SETTING |

FIG. 10

| FORMAT | ATTRIBUTE |
|---|---|
| MMR COMPRESSED TIFF | MONOCHROME TEXT |
| JPEG COMPRESSED GRAYSCALE | GRAYSCALE PHOTO |
| JPEG COMPRESSED COLOR | COLOR PHOTO |
| OTHER | COMPLIANT TO PRIORITY SETTING |

FIG. 11

| ATTRIBUTE FLAG DATA | | COLOR PROCESSING | HALFTONING | SHARPNESS | ENLARGEMENT/ REDUCTION METHOD | GAMM |
|---|---|---|---|---|---|---|
| TEXT ATTRIBUTE | | FOR TEXT | ERROR DIFFUSION | FOR TEXT | TONE PRIORITY | 1 |
| PHOTO ATTRIBUTE | | FOR PHOTO | REDUCED LINE SCREEN | FOR PHOTO | TONE PRIORITY | 2.2(or 1.8) |
| AUTO | MONOCHROME TEXT ATTRIBUTE | FOR MONOCHROME TEXT | ERROR DIFFUSION | FOR MONOCHROME TEXT | THIN LINE REPRODUCTION PRIORITY | 1 |
| | GRAYSCALE PHOTO ATTRIBUTE | FOR MONOCHROME | REDUCED LINE SCREEN | FOR TEXT | TONE PRIORITY | 1 |
| | COLOR PHOTO ATTRIBUTE | FOR PHOTO | ERROR DIFFUSION | FOR PHOTO | TONE PRIORITY | 2.2(or 1.8) |

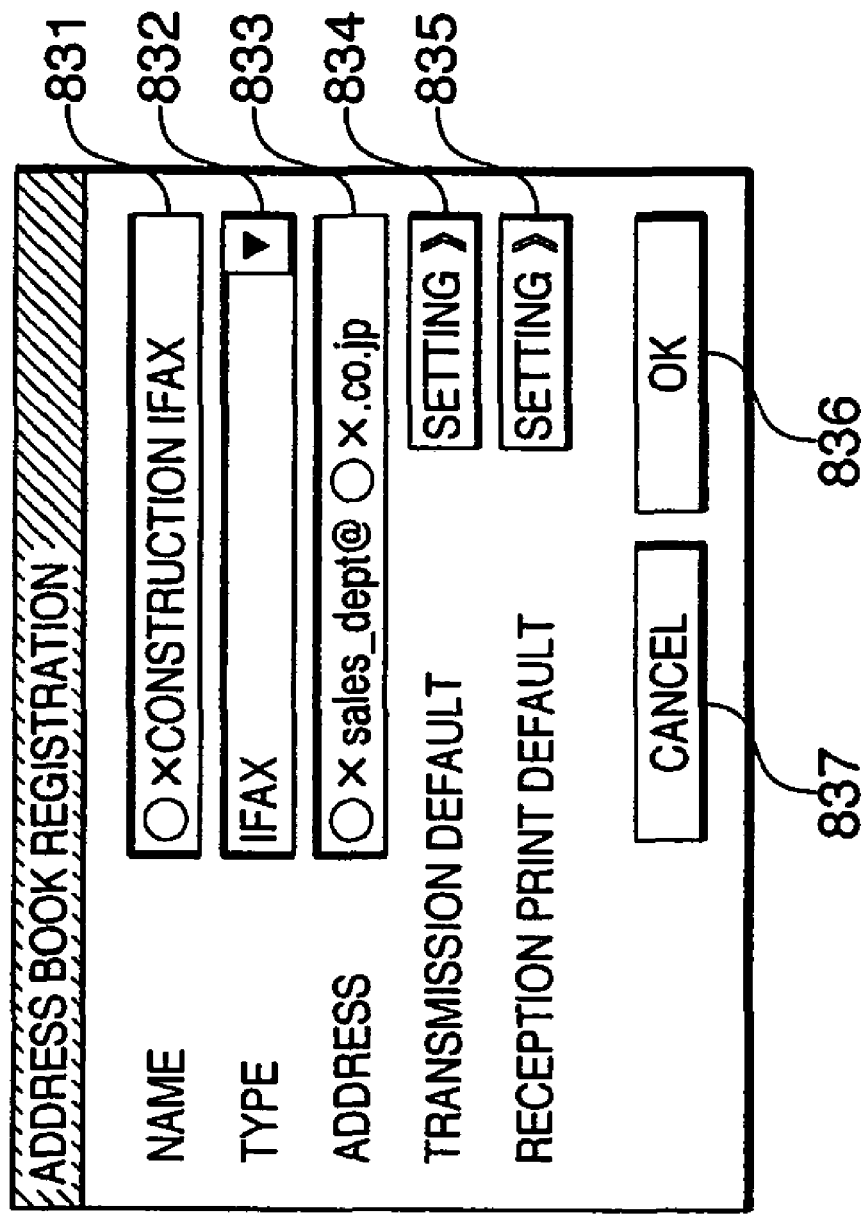

IMAGE PROCESSING APPARATUS AND ITS METHOD

FIELD OF THE INVENTION

The present invention relates to an image processing apparatus and its method and, more particularly, to image processing to be applied to print received image data.

BACKGROUND OF THE INVENTION

Like a copying machine, a system which generates digital image data by scanning a document and printing it after image processing is applied to the digital image data is available. In such system, a method of obtaining a copy output with high image quality by determining image attributes for respective pixels or blocks of input image data, and applying optimal image processing to each attribute is known.

For example, Japanese Patent No. 3,023,374 discloses a method of analyzing image data obtained by scanning a document to separate the image data into at least two regions, i.e., a character region and grayscale image region, and selectively applying first and second image processes to these regions. The first and second image processes include color conversion processing such as color correction, undercolor removal, and the like, and edit processing such as mosaic image conversion, mirror image conversion, and the like in addition to processing for selectively smoothing or sharpening the character region and grayscale image region to desired levels. Also, means for manually setting parameters used in these image processes is equipped.

On the other hand, when a digital document generated by a computer or the like is to be printed out, data (PDL data) described in a page description language is interpreted. Then, attribute information of each object is obtained, and image processing for printing is selectively used for character data or photo data in accordance with the attribute information to obtain a printout with high image quality. Such method is also known.

For example, Japanese Patent Laid-Open No. 6-320802 discloses a method of outputting an image by interpreting PDL data generated by a host computer, generating object information indicating each image element, and executing processing based on the generated information upon reception of the PDL data.

These techniques are carried out to improve the image quality of an output in consideration of the fact that preferred image qualities tend to differ for respective objects which form an image. That is, there is a tendency to place an importance on sharpness and contrast for a character region, and to place an importance on smooth tone reproduction for a photo region. Furthermore, in some cases, the parameters of these processes are preferably set in consideration of characteristics for respective models of printers and for each individual printer so as to attain optimal image reproduction in correspondence with the characteristics of printers and color materials.

As means for printing out digital data received from outside the apparatus, apparatuses which not only have a facsimile print function and PDL data print function but also have print functions of e-mail and Internet facsimile (IFAX) and the like are commercially available in recent years.

Attribute information or information used to generate attribute information is often not appended to received data to be printed. In this case, the image processing methods and image processing parameters executed in the apparatus are set without exception independently of the received data, or after attribute determination processing is executed for the received data, the image processing methods and image processing parameters suited to attributes are set. If the same image processing methods and image processing parameters are set, an output that the user does not want may be output each time by executing processing which does not match the purpose of output or user's favor in terms of image quality. On the other hand, if the attribute determination processing is executed for the received data, not only high processing cost is required, but also a long processing time is required depending on the characteristics of the received data, resulting in a considerable drop of the apparatus performance.

SUMMARY OF THE INVENTION

The first aspect of the present invention discloses an image processing method comprising the steps of:
receiving image data;
converting the image data into raster data;
applying image processing for printing to the raster data in accordance with attribute information;
setting control information that controls generation of the attribute information, which, in turn, controls the image processing; and
generating the attribute information based on the image data and the control information.

According to the present invention, preferred image processing for printing can be applied to received image data. Also, image processing for printing according to received image data or user's settings can be applied to the received image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a view for explaining automatic generation of attribute flag data;

FIG. 11 is a table used to determine settings of image processes according to the attribute flag data;

FIG. 12 shows an address book registration window according to the second embodiment of the present invention;

DETAILED DESCRIPTION OF THE PREFERRED EMBODIMENTS

Image processing according to preferred embodiments of the present invention will be described in detail hereinafter with reference to the accompanying drawings. In the following embodiments to be exemplified hereinafter, the present invention is applied to a digital multi-functional peripheral equipment (MFP). However, the present invention can also be applied to various image processing apparatuses and output devices used to print data received from outside the apparatus.

First Embodiment

Figure 1:
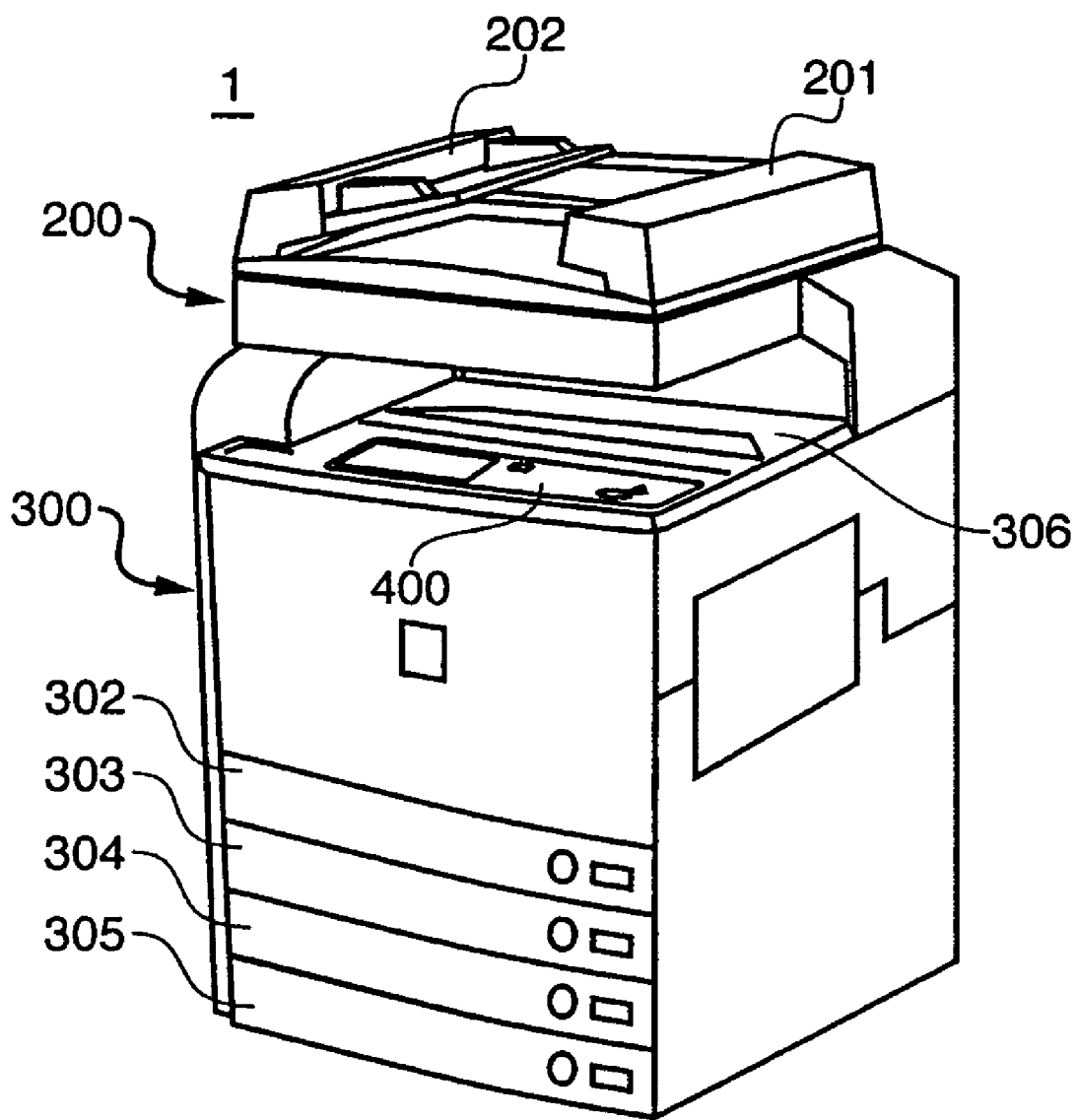
FIG. 1 is a schematic perspective view showing an outer appearance of a digital multi-functional peripheral equipment (MFP) according to the first embodiment of the present invention.

FIG. 1 shows an outer appearance of an MFP 1 according to the first embodiment of the present invention.
[Image Input Unit (Scanner)]

Referring to FIG. 1, a scanner 200 as an image input device illuminates a document image and scans a CCD line sensor (not shown), thus converting the document image into an electrical signal as raster image data. The user sets document sheets on a tray 202 of a document feeder 201, and inputs a scan instruction from a console 400. In response to this instruction, a controller 100 (to be described later) controls the scanner 200 to scan each document image which is fed one by one by the feeder 201.
[Image Output Unit (Printer)]

Referring to FIG. 1, a printer 300 as an image output device prints an image based on raster image data on a print sheet. As a print system of the printer 300, an electrophotographic system that fixes toner on a print sheet using a photosensitive drum or photosensitive belt, an ink-jet system that prints an image using ink, and the like are preferably adopted. The print operation of the printer 300 starts in response to an instruction from the controller 100 (to be described later). The printer 300 has a plurality of paper feed stages which allow to select print sheets with different sizes or orientations, and is mounted with print sheet cassettes 302 to 305 corresponding to these paper feed stages. Also, printed print sheets are exhausted onto an exhaust tray 306.
[Arrangement of Control System]

Figure 2:
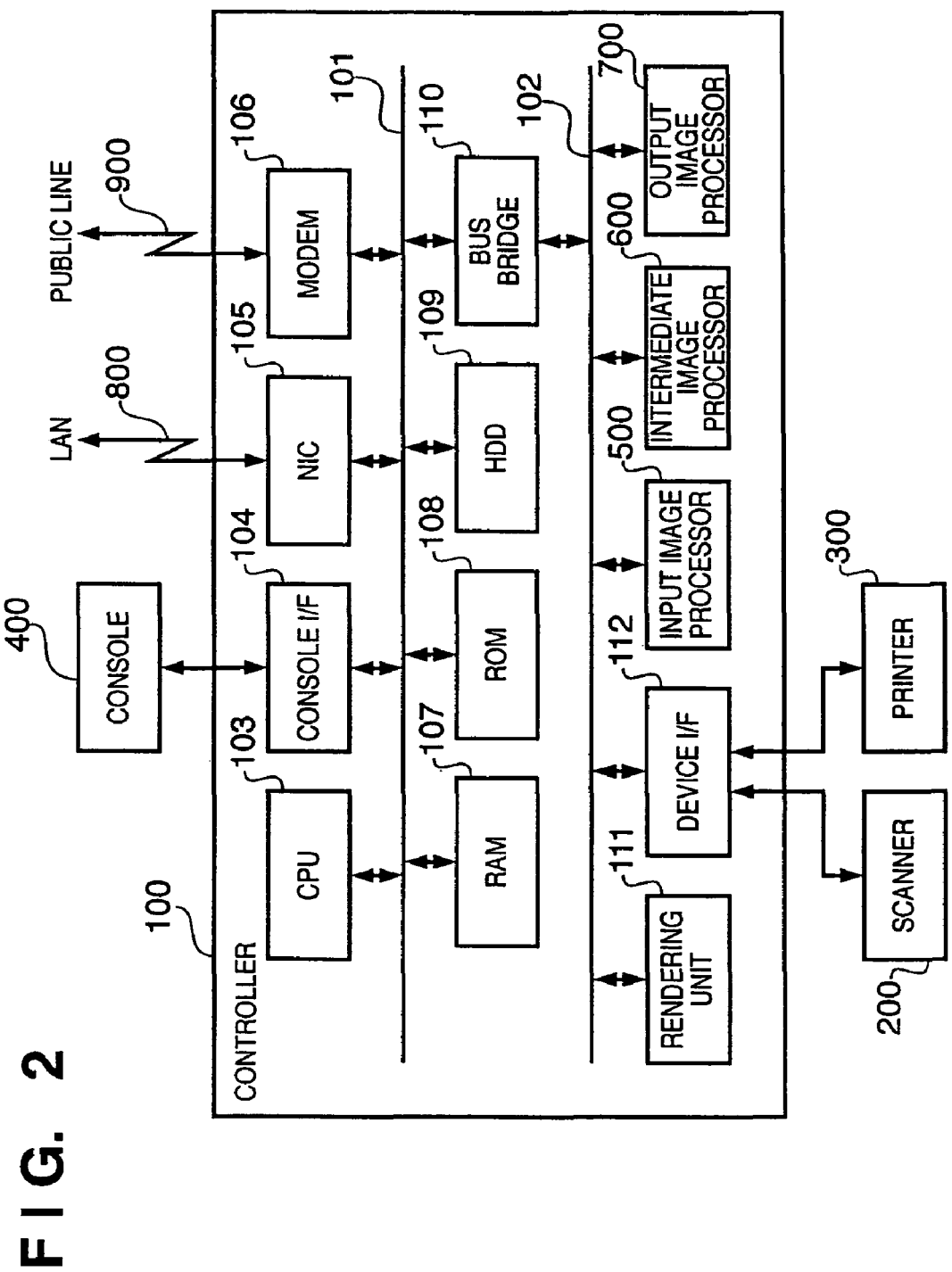
FIG. 2 is a block diagram showing the arrangement of a control system of the digital MFP.

FIG. 2 is a block diagram showing the arrangement of a control system of the MFP 1.

The controller 100 is connected to the scanner 200 and printer 300 to control them. Also, the controller 100 is connected to a network (LAN) 800 such as a local area network and a public line 900 to exchange image data and device information.

A CPU 103 executes a control program and image processing program stored in a ROM 108 and hard disk drive (HDD) 109 using a RAM 107 as a work memory. The CPU 103 controls respective components to be described later via a system bus 101 and image bus 102. The RAM 107 and HDD 109 are also used as image memories that temporarily store image data.

A console interface (I/F) 104 is an interface with the console 400. The console I/F 104 sends an input (instruction) of the user who operates the console 400 to the CPU 103, and outputs image data to be displayed on an LCD of the console 400 to the console 400.

A network interface card (NIC) 105 is an interface with the LAN 800, and exchanges data and information with the LAN 800. A MODEM 106 is an interface with the public line 900, and exchanges data and information via the public line 900.

The aforementioned components are connected onto the system bus 101. A bus bridge 110 is an interface between the system bus 101 and the image bus 102 that transfers image data at high speed, and bridges the data flow between the system bus 101 and image bus 102 by converting a data structure. Note that the image bus 102 comprises a high-speed bus such as a Peripheral Component Interconnect (PCI) bus, IEEE1394, or the like.

Components connected onto the image bus 102 will be described below. A rendering unit 111 renders PDL data into a bitmap image, and converts information appended to the PDL data into attribute flag data (to be described later) which can be used inside the controller 100.

A device I/F 112 is an interface between the image input and output devices (scanner 200 and printer 300 or the like) and converts synchronization/asynchronization of image data transfer. Note that the device I/F 112 and the image input and output devices are connected via a serial bus such as Universal Serial Bus (USB), IEEE1394, or the like.

An input image processor 500 applies correction, modification, and edit processes that considers the subsequent print processing or image transmission to image data input from the scanner 200 or image data received outside from the apparatus via the NIC 105. An intermediate image processor 600 executes data compression/decompression processing and image enlargement/reduction processing. An output image processor 700 applies correction, resolution conversion, and the like according to the printer 300 to image data to be printed.

Note that image data and attribute flag data as the rendering result of the rendering unit 111 are often input to the intermediate image processor 600 without the intervention of the input image processor 500. As will be described later, when image data received from outside the apparatus is to be processed, that image data and attribute flag data assigned according to the settings from the console 400 are often input to the intermediate image processor 600 without the intervention of the input image processor 500.

Input Image Processor

Figure 3:
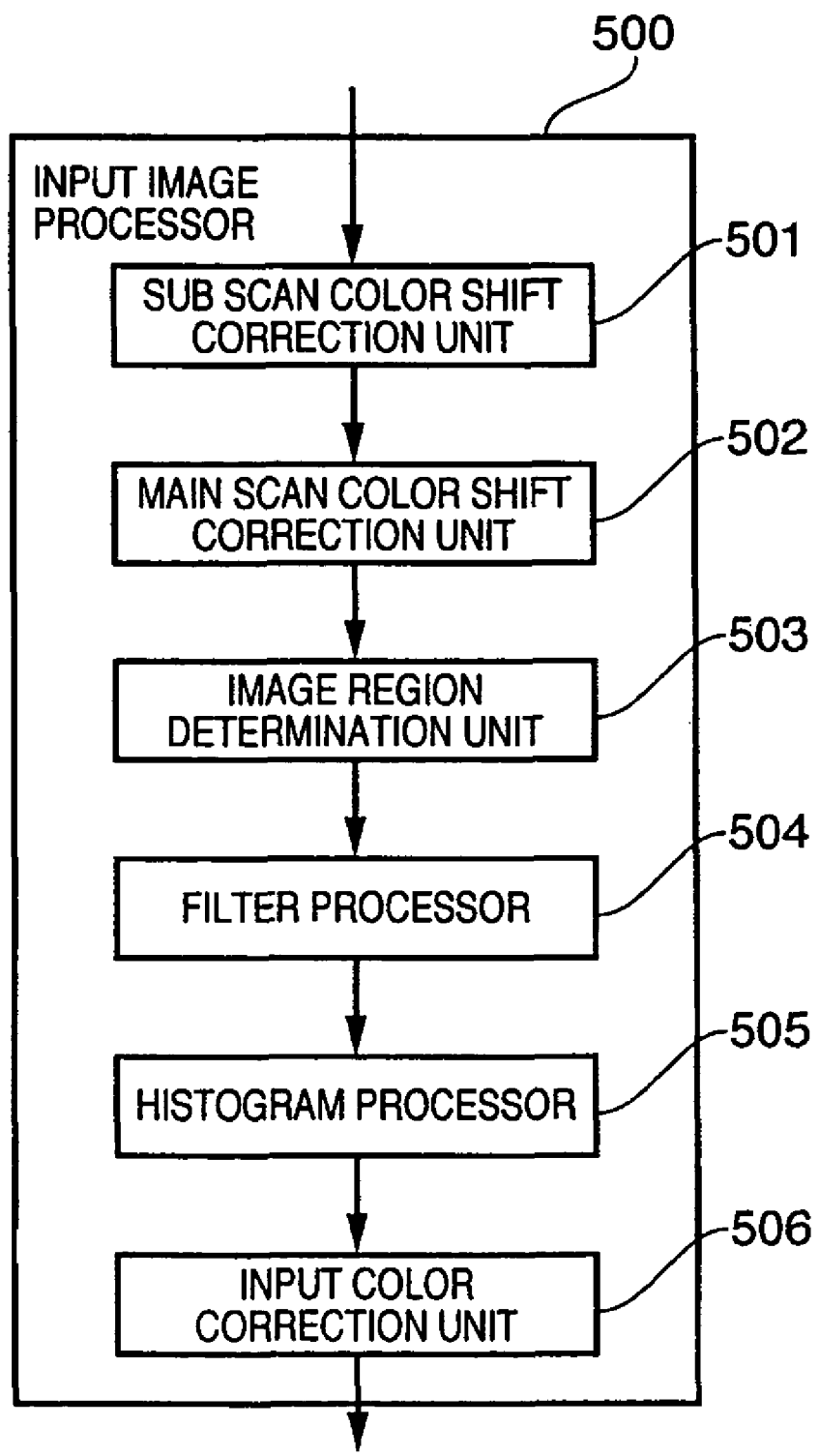
FIG. 3 is a block diagram showing a detailed arrangement of an input image processor.

FIG. 3 is a block diagram showing the detailed arrangement of the input image processor 500.

A sub-scan color misregistration correction unit 501 performs, e.g., 1×5 matrix operations for respective colors of image data so as to correct any color misregistration in the sub-scan direction of image data input to the input image processor 500.

A main-scan color misregistration correction unit 502 performs, e.g., 5×1 matrix operations for respective colors of image data so as to correct any color misregistration in the main scan direction of the image data output from the sub-scan color misregistration correction unit 501.

An image region determination unit 503 identifies the types and building pixels of image regions which form an image represented by the image data output from the main-scan color misregistration correction unit 502. That is, the unit 503 generates, for respective pixels, attribute flag data indicating image regions (photo region, character region, chromatic color region, achromatic color region, and the like) to which respective pixels of the image belong. These attribute flag data are referred to in the processing to be described later.

A filter processor 504 performs, e.g., a 9×9 matrix operation so as to arbitrarily correct the spatial frequency of the image data output from the image region determination unit 503.

A histogram processor 505 generates a histogram of pixel values by subsampling and counting the image data output from the filter processor 504. This histogram is used to determine, e.g. whether the image represented by the image data is a color or monochrome image and to determine the background level of the image data.

An input color correction unit 506 executes, e.g., processing for mapping a color gamut of the image data onto an arbitrary color gamut or the like so as to correct tint of the image data output from the histogram processor 504.

The image data processed by the input image processor 500 in this way is sent to the intermediate image processor 600 together with the attribute flag data generated by the image region determination unit 503.

The processing modules of the input image processor 500 are not limited to those shown in FIG. 3, and other image processing modules may be added or some image processing modules may be omitted. The order of image processing modules (the processing order of image data) is not limited to that shown in FIG. 3. In other words, the input image processor 500 in the first embodiment need only comprise at least one of the image processing modules shown in FIG. 3.

Intermediate Image Processor

Figure 4:
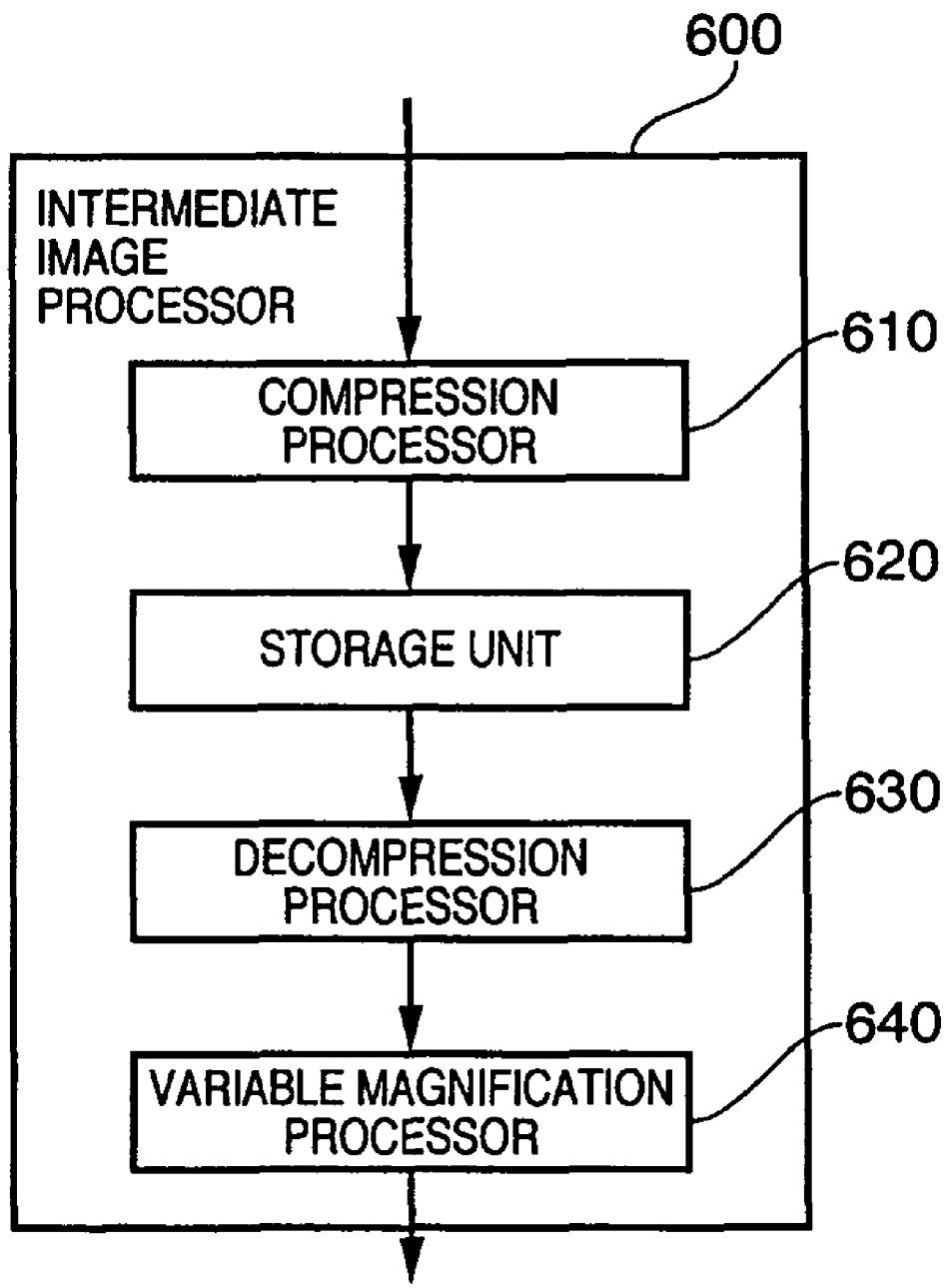
FIG. 4 is a block diagram showing a detailed arrangement of an intermediate image processor.

FIG. 4 is a block diagram showing the detailed arrangement of the intermediate image processor 600.

A compression processor 610 compresses the image data and attribute flag data input to the intermediate image processor 600 by predetermined compression methods, respectively, and stores them in a storage unit 620. Note that the storage unit 620 comprises a large-capacity hard disk or the like.

A decompression processor 630 reads out compressed data from the storage unit 620 and decompresses them to the image data and attribute flag data.

A variable magnification processor 640 enlarges or reduces the image data output from the decompression processor 630 in accordance with a magnification ratio set by the user by operating the console 400 or a magnification ratio according to data received from outside the apparatus. This enlargement/reduction processing can adopt one of the following enlargement/reduction methods: a nearest neighbor method which assigns a neighboring pixel value to a known pixel of interest to replace it, a bilinear method which assigns an interpolated value between the pixel of interest and neighboring pixels, a bi-cubic method which applies function processing to neighboring pixels, and assigns that value, and the like.

Output Image Processor

Figure 5:
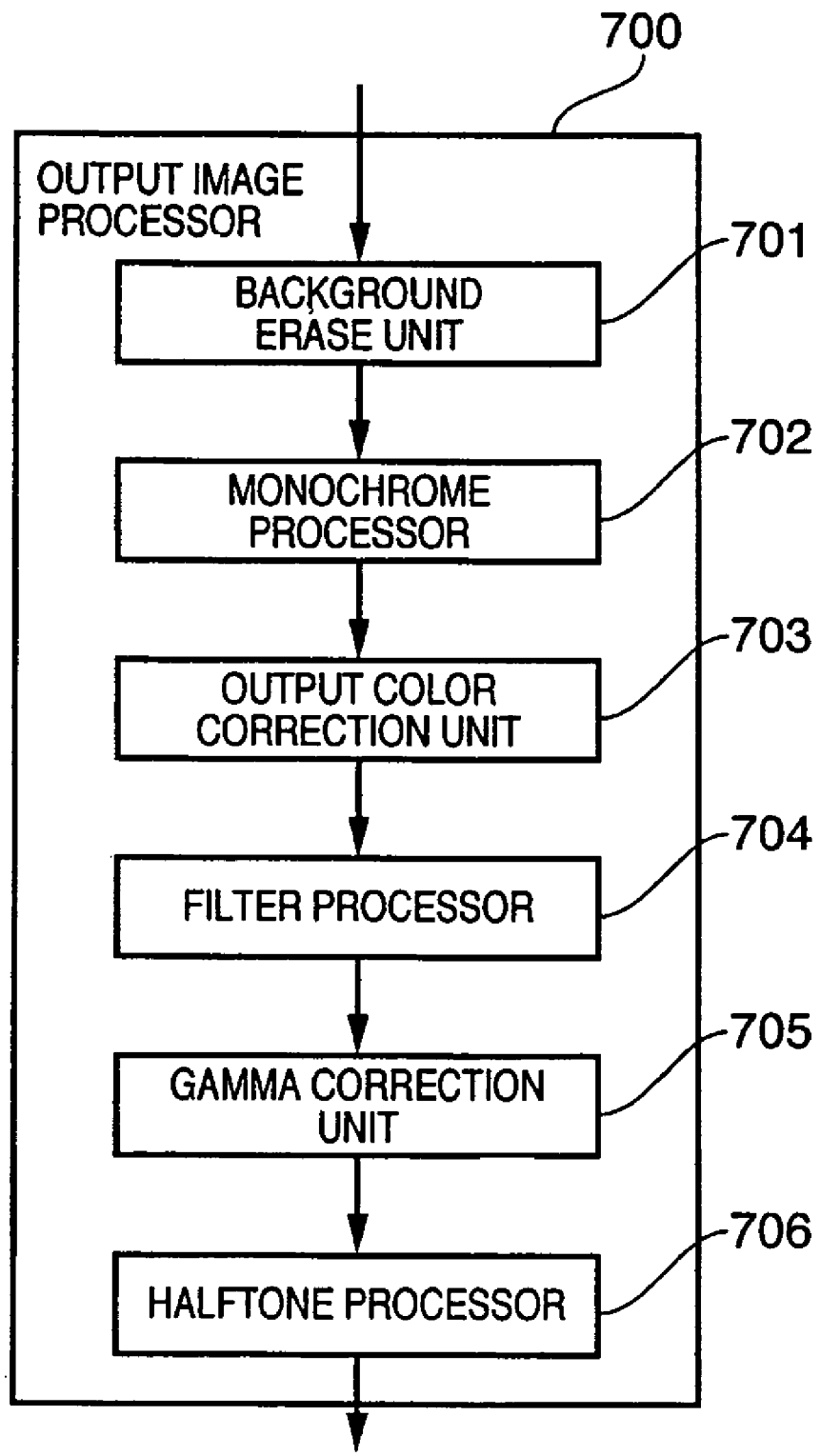
FIG. 5 is a block diagram showing a detailed arrangement of an output image processor.

FIG. 5 is a block diagram showing the detailed arrangement of the output image processor 700.

A background erase unit 701 performs background erase processing using, e.g., a 3×8 matrix operation and one-dimensional lookup table (1DLUT), so as to erase the background color of the image data, i.e., any unwanted background fog.

A monochrome generator 702 performs, e.g., a 1×3 matrix operation, so as to convert arbitrary constants to RGB values to convert color image data (e.g., RGB data) into monochrome grayscale data when color image data is to be printed as monochrome data.

An output color correction unit 703 performs, e.g., processing using a 4×8 matrix operation and direct mapping, so as to apply color correction to the image data output from the monochrome generator 702 in correspondence with the color reproduction characteristics of the printer 300.

A filter processor 704 performs, e.g., 9×9 matrix operation processing, so as to arbitrarily correct the spatial frequency of the image data output from the output color correction unit 703.

A gamma correction unit 705 performs processing normally using a one-dimensional lookup table (1DLUT), so as to apply gamma correction to the image data output from the filter processor 704 in correspondence with the tone characteristics of the printer 300.

A halftone processor 706 performs arbitrary digital halftoning (e.g., simple binarization, dithering, arbitrary screen processing, error diffusion, or the like) for adjusting the image data output from the gamma correction unit 705 to the number of tones that can be reproduced by the printer 300. Note that the number of tones that can be reproduced by the printer is 2, 3, 4, 256, or the like depending on the models of printers.

The image data processed by the output image processor 700 in this way is sent to the printer 300.

The processing modules of the output image processor 700 are not limited to those shown in FIG. 5, and other image processing modules may be added or some image processing modules may be omitted. The order of image processing modules (the processing order of image data) is not limited to that shown in FIG. 5. In other words, the output image processor 700 in the first embodiment need only comprise at least one of the image processing modules shown in FIG. 5.

Attribute Flag Data

The attribute flag data output from the rendering unit 111 or input image processor 500, or assigned according to the console 400 upon processing image data received from outside the apparatus are referred to in the processing after the filter processor 504 of the input image processor 500. With this reference, image processing is applied based on optimal processing parameters to respective image regions.

For example, the filter processor 704 of the output image processor 700 emphasizes the sharpness of characters by emphasizing high-frequency components of an image region whose attribute flag data indicates a character region. To an image region whose attribute flag data indicates a halftone dot region, processing for removing moiré components unique to a halftone dot image by applying so-called low-pass filter processing is applied.

In some cases, a mode called a toner save mode that saves print cost by reducing the toner consumption amount is set. In such case, the output color correction unit 703 of the output image processor 700 executes the processing for reducing the toner consumption amount by adjusting the reduction ratios of toner consumption amounts in correspondence with the character region, photo region, and halftone dot region with reference to the attribute flag data.

In this way, the processing modules of the input image processor 500, intermediate image processor 600, and output image processor 700 execute optimal processes to respective image regions in accordance with the attribute flag data, thus attaining high image quality or suppressing deterioration of image quality of an output image.

Console

Figure 6:
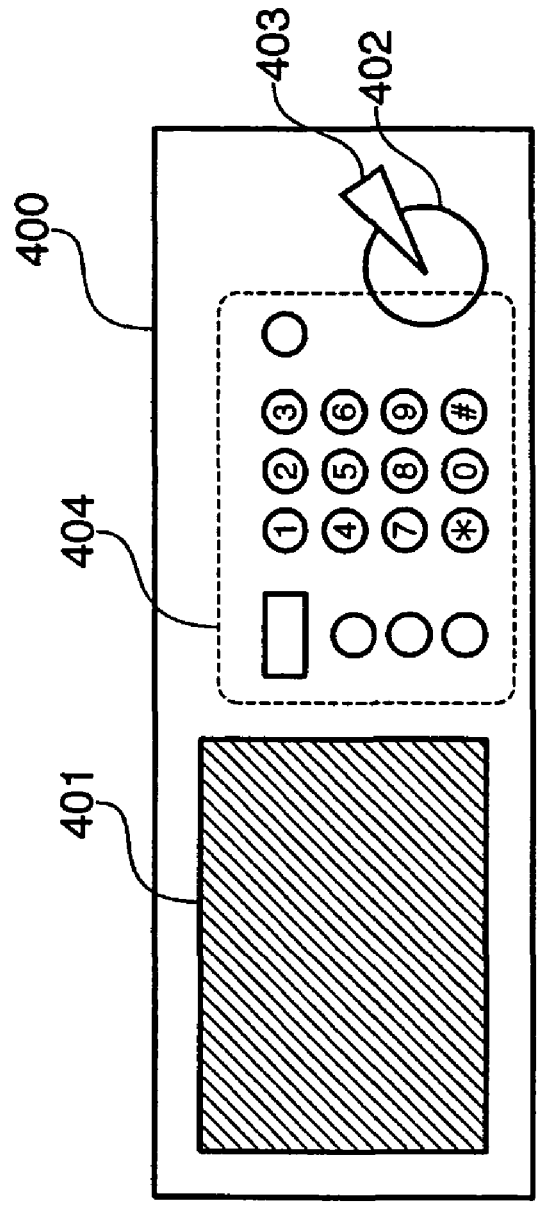
FIG. 6 is a view showing the arrangement of a console.

FIG. 6 shows the arrangement of the console 400.

A liquid crystal control panel 401 comprises a combination of an LCD and touch panel, and can display setting contents of the MFP 1, software keys, and the like. A start key 402 is a hardware key used to input a start instruction of a copying operation or the like, and incorporates green and red LEDs. When the copying operation or the like is ready to start, the green LED is turned on; otherwise, the red LED is turned on. A stop key 403 is a hardware key used to input a stop instruction of the copying operation or the like. A hardware key group 404 includes a numeric keypad, clear key, reset key, guide key, user mode key, and the like.

[Setting of Reception Print Mode]

Figure 7:
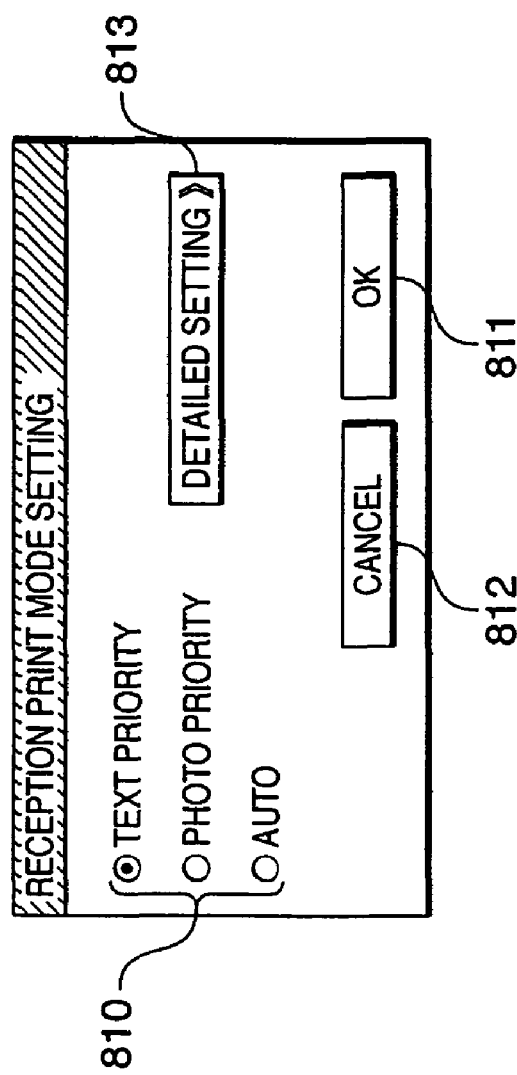
FIG. 7 shows an example of a window to be displayed on a liquid crystal control panel by a CPU upon setting a reception print mode.

FIG. 7 shows a window displayed on the liquid crystal control panel 401 by the CPU 103 upon setting a reception print mode.

The user can set print image quality upon reception of IFAX data using one of radio buttons 810 displayed on the window. When the user selects one of the buttons "character priority", "photo priority", and "auto" and presses an "OK" button 811, the CPU 103 closes the setting window of the reception print mode, and records information corresponding to the image quality selected at that time in a predetermined area of the RAM 107. Therefore, the print image quality set on the reception print mode setting window is applied to the subsequent reception print processing. When the user presses a "cancel" button 812, the CPU 103 closes the reception print mode setting window, and does not change information of the image quality recorded in the predetermined area of the RAM 107.

Figure 8:
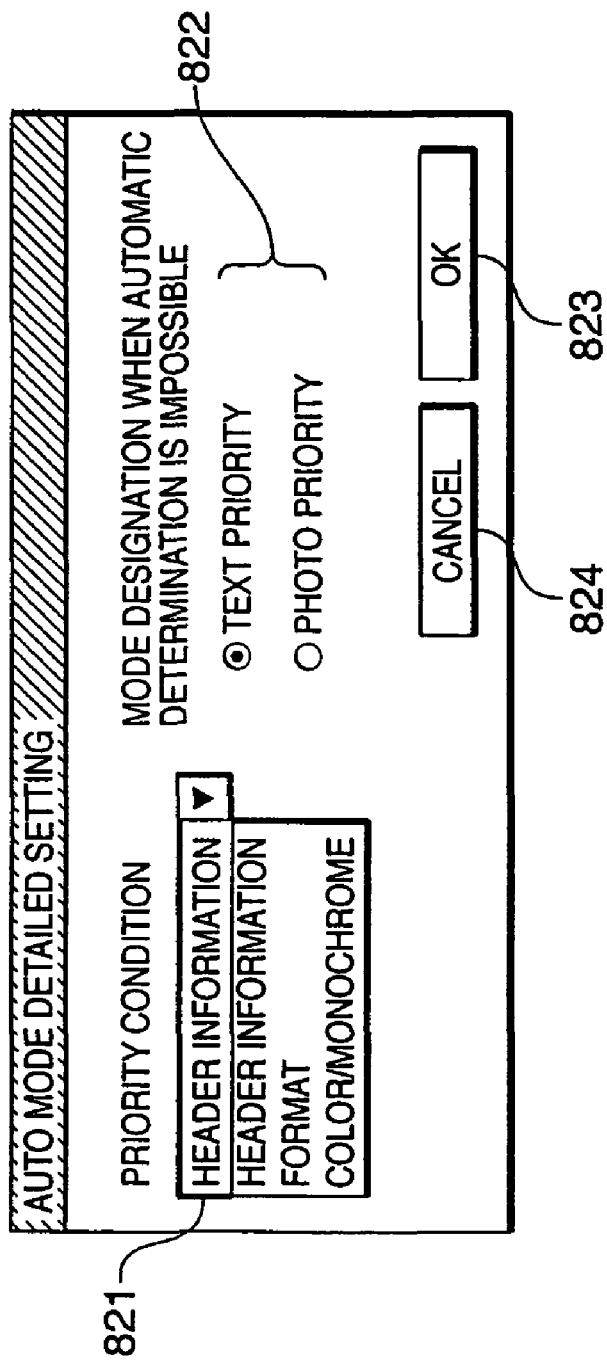
FIG. 8 shows a detailed setting window of an auto mode.

When the user presses a "detailed setting" button 813 which is enabled only when "auto" is selected, the CPU 103 displays a detailed setting window of the auto mode shown in FIG. 8 on the liquid crystal control panel 401 so as to make detailed settings.

The user sets information to be prioritized (priority condition), which is required to automatically determine the image quality of the reception print mode using a pull-down menu 821. This pull-down menu includes, e.g., header information, a format of image data, color or monochrome, and the like. Furthermore, the user sets "character priority" or "photo priority" for the image quality when automatic determination is impossible by operating one of radio buttons 822. When the user presses an "OK" button 823, the CPU 103 closes the auto mode detailed setting window, and records information (auto) corresponding to the image quality selected at that time, the priority condition, and the designated mode when automatic determination is impossible in the predetermined area of the RAM 107. When the user presses a "cancel" button 824, the CPU 103 closes the auto mode detailed setting window, and displays the reception print mode setting window again. Note that the contents set immediately before the auto mode detailed setting window was opened are maintained intact on the reception print mode setting window.

[Generation Processing of Attribute Flag Data]

Figure 9:
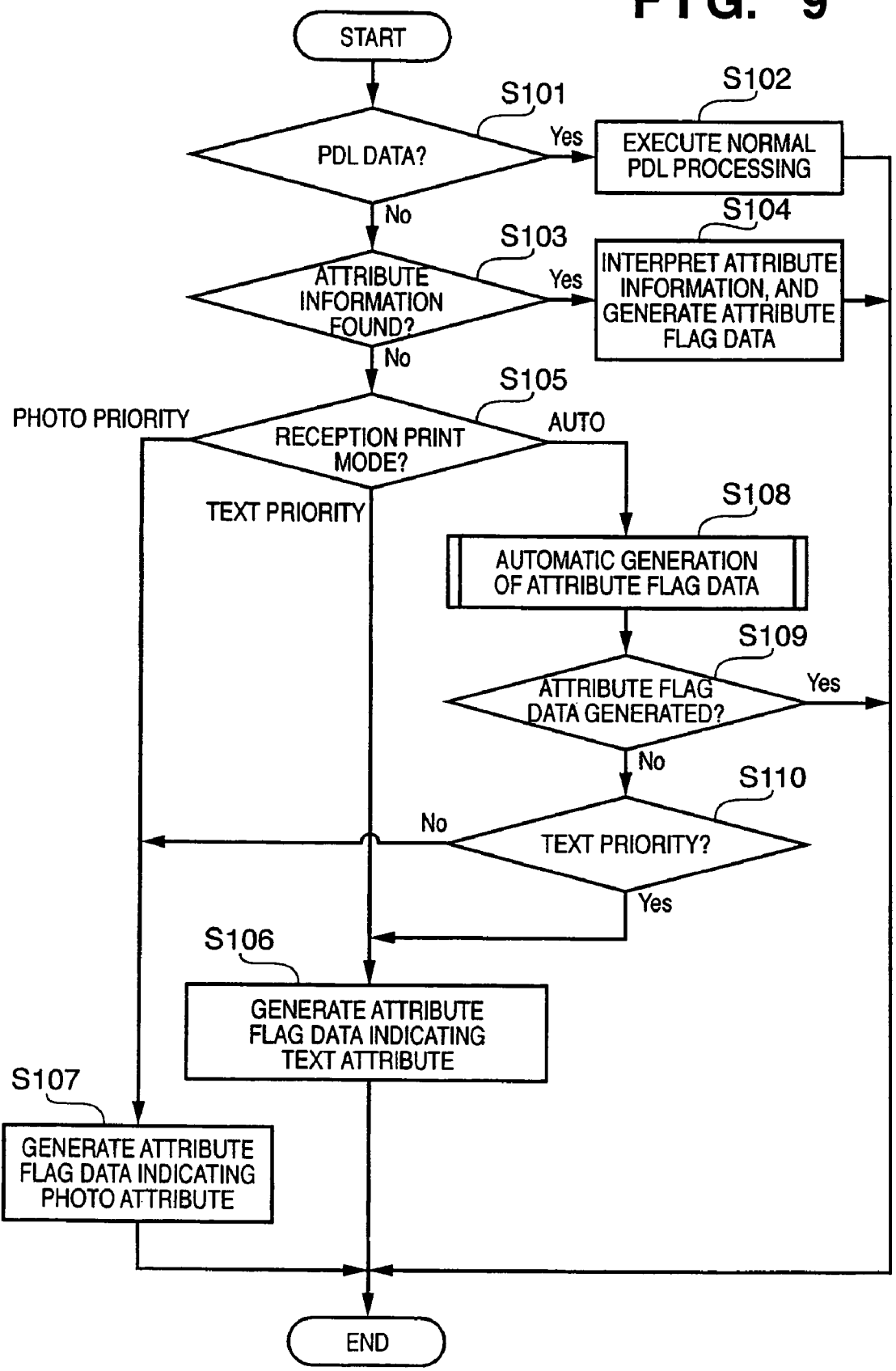
FIG. 9 is a flowchart showing generation processing of attribute flag data upon reception of data to be printed from outside the apparatus.

FIG. 9 is a flowchart showing the generation processing of the attribute flag data upon reception of data to be printed from outside the apparatus. This processing is executed by the CPU 103.

Upon reception of data to be printed from outside the apparatus, the CPU 103 checks if the received data is PDL data (S101). If the received data is PDL data, the CPU 103 controls the rendering unit 111 to process the PDL data (normal processing) (S102). Therefore, the rendering unit 111 generates attribute flag data during rendering of the PDL data.

On the other hand, if the received data is not PDL data, the CPU 103 checks if the received data includes interpretable attribute information (S103). If the received data includes interpretable attribute information, the CPU 103 interprets that attribute information to generate attribute flag data (S104). Note that the interpretable information is, for example, information which designates "character mode print" or "photo mode print" described in the header of the data. For example, in case of IFAX, the header of the data includes a description indicating the characteristics of image data such as Minimal B&W, Extended B&W, JBIG B&W, Lossy Color, Lossless Color, Mixed Raster Content, and the like. Therefore, in case of B&W, attribute flag data of a character attribute can be generated. Also, in case of Color, attribute flag data of a photo attribute can be generated.

If the received data does not include any interpretable attribute information, the CPU 103 checks the reception print mode (S105). If the reception print mode is set to be "character priority", the CPU 103 generates attribute flag data indicating a character attribute for the received data (S106). On the other hand, if the reception print mode is set to be "photo priority", the CPU 103 generates attribute flag data indicating a photo attribute for the received data (S107). Also, if the reception print mode is set to be "auto", the CPU 103 performs automatic generation of attribute flag data (to be described later) (S108), and checks if attribute flag data can be generated (S109). If attribute flag data cannot be generated, the CPU 103 checks if the detailed setting in case of "auto" is "character priority" or "photo priority" (S110). If "character priority" is selected, the CPU 103 generates attribute flag data indicating a character attribute for the received data (S106); if "photo priority" is selected, it generates attribute flag data indicating a photo attribute for the received data (S107).

FIG. 10 is a view for explaining automatic generation (S108) of attribute flag data.

The CPU 103 determines attribute flag data to be generated in accordance with the format of the received data. For example, if the received data is data (e.g., MMR-compressed TIFF (tagged-image file format) data or JBIG (join bi-level image group) data) which is compressed by a coding method for a binary image such as Modified Modified READ (MMR), JBIG, or the like, it is demanded to accurately reproduce a binary image like a facsimile image. Hence, the CPU 103 generates attribute flag data of a character attribute to apply optimal image processing to a monochrome image. Likewise, if the received data is grayscale image data (e.g., JPEG (joint photographic image coding experts group)-compressed grayscale image) which is encoded by a coding method for a multi-valued image, the CPU 103 generates attribute flag data indicating a grayscale photo attribute. Also, if the received data is, e.g., a JPEG-compressed color image or the like, the CPU 103 generates attribute flag data indicating a color photo attribute.

In case of the received data, the attribute flag data of which cannot be determined by the above method, the CPU 103 cannot generate any attribute flag data. In this case, the CPU 103 generates attribute flag data according to the detailed setting when the reception print mode is "auto" in step S110.

FIG. 11 is a table used to determine the settings of image processing according to the attribute flag data. This table is stored in, e.g., the ROM 108 or the like.

The CPU 103 switches the settings of respective processors to those suited to print a character image, as shown in FIG. 11, for the attribute flag data indicating the character attribute. That is, as for the color processing, the CPU 103 switches the settings of the gamut mapping of the input color correction unit 506, and the matrix operation and toner consumption amount control of the output color correction unit 703 to those suited to print a character image. Furthermore, the CPU 103 switches the settings of the digital halftoning (halftone processor 706), sharpness (filter processor 704), enlargement/reduction method (variable magnification processor 640), gamma (gamma correction unit 705) to those suited to print a character image. Therefore, the character region and line region of the received data can be printed with high image quality.

Note that the color processing executes character priority processing by setting matrix coefficients used in the output color correction unit 703 to be those which give priority to reproducibility of black characters. In this color processing, the color material amount is also taken into consideration to improve the reproducibility of a high-density thin line region such as the character region and the like. As for the sharpness processing, processing for emphasizing the edges of characters and lines is executed by applying spatial frequency filter coefficients that can improve the sharpness as matrix coefficients used in the filter processor 704. As for the halftoning, the halftone processor 706 is controlled to execute digital halftoning based on error diffusion, thus carrying out processing for improving the reproducibility of fine characters. In the gamma processing, a gamma value that allows the printer 300 to reproduce characters and lines with high image quality is set in the gamma correction unit 705. As the enlargement/reduction method, the variable magnification processor 640 is controlled to execute a bi-cubic method using, e.g., coefficients with which thin line information of characters do not disappear.

The CPU 103 switches the settings of respective processors to those suited to print a photo image, as shown in, e.g., FIG. 11, for the attribute flag data indicating the photo attribute. As for the color processing, the CPU 103 switches the settings of the gamut mapping of the input color correction unit 506, and the matrix operation and toner consumption amount control of the output color correction unit 703 to those suited to print a photo image. Furthermore, the CPU 103 switches the settings of the digital halftoning (halftone processor 706), sharpness (filter processor 704), enlargement/reduction method (variable magnification processor 640), gamma (gamma correction unit 705) to those suited to print a photo image. Therefore, the photo region of the received data can be printed with high image quality.

The CPU 103 sets color processing that gives priority to reproduction of an achromatic color in the output color correction unit 703 for the attribute flag data indicating the grayscale photo attribute.

Of course, when attribute flag data are set for respective image regions, the received data can be printed with high image quality for respective image regions. A change in image processing may be attained by switching the image processing and processing parameters by each image processing module with reference to the attribute flag data in place of the CPU 103.

In the above description, the settings of image processing are switched in accordance with the attribute flag data. However, the switching method is not limited to the aforementioned method. The point is to execute image processing by setting image processing and processing parameters so as to print each image region indicated by the attribute flag data with high image quality. FIG. 11 presents five types of attribute flag data. However, these types of attribute flag data are merely an example, and the present invention is not limited to this.

Second Embodiment

Image processing according to the second embodiment of the present invention will be described below. Note that the same reference numerals in the second embodiment denote the same components as in the first embodiment, and a detailed description thereof will be omitted.

Generation of attribute flag data in the reception print mode described in the first embodiment can be registered in correspondence with transmission sources of data to be printed.

FIG. 12 shows an address book registration window in the second embodiment. The CPU 103 displays this window on the liquid crystal control panel 401. Note that the address book is a function of the MFP 1, i.e., that of registering in advance information of a communication partner.

Referring to FIG. 12, the user inputs (or selects) a name to be registered in the address book in a name input field 831, and selects a communication protocol (e.g., e-mail, facsimile, IFAX, FTP, and the like) using a drop-down menu of a type selection field 832. The subsequent input window will change depending on the selected communication protocol. In this case, a case will be exemplified wherein "IFAX" is selected.

The user can input an address of IFAX in an address input field 833 to complete the registration.

When the user presses a transmission default "setting" button 834, the CPU 103 displays a window used to make default settings (e.g., a resolution, scan mode, and the like) upon sending IFAX in the address input field 833. However, a detailed description thereof will be omitted.

Figure 13:
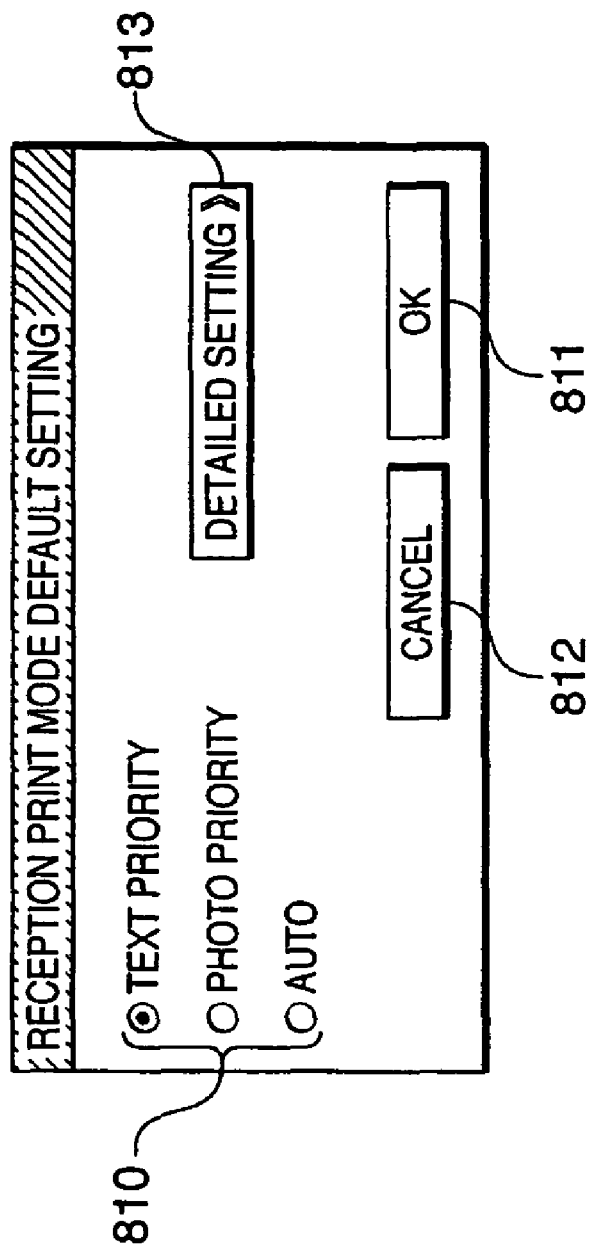
FIG. 13 shows a reception print mode default setting window.

When the user presses a reception default "setting" button 835, the CPU 103 displays a reception print mode default setting window (FIG. 13) which is the same as the reception print mode setting window in FIG. 7. The user can set the reception print mode upon printing data received from the address input in the address input field 833 on the address book registration window using the reception print mode default setting window. The reception print mode set on the reception print mode default setting window is used in preference to that set on the reception print mode setting window, needless to say.

When the default reception print mode is set for each communication partner in the address book, data received from a specific partner can always undergo the same attribute flag data setting processing.

Third Embodiment

Image processing according to the third embodiment of the present invention will be described below. Note that the same reference numerals in the third embodiment denote the same components as in the first and second embodiments, and a detailed description thereof will be omitted.

The first and second embodiments have explained the processing associated with generation of attribute flag data used to control the settings of image processing. Furthermore, processing associated with page settings will be explained as the third embodiment.

The attribute information used by the MFP 1 includes information indicating an attribute for each print page: for example, information indicating the obverse or reverse face upon two-sided printing, layout information when a plurality of pages are to be printed on a single print sheet in a reduced scale, and the like. Processing for generating these pieces of attribute information in the reception print mode will be described below.

Figure 14:
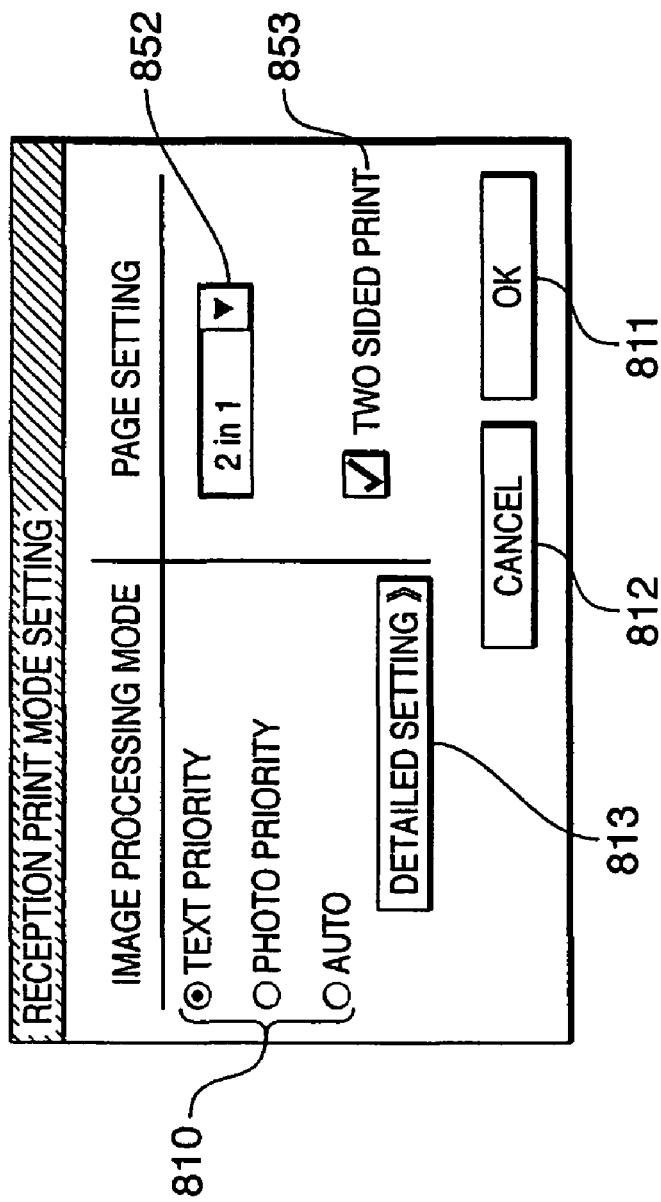
FIG. 14 shows a reception print mode setting window according to the third embodiment of the present invention.

FIG. 14 shows a reception print mode setting window in the third embodiment. The CPU 103 displays this window on the liquid crystal control panel 401.

The window shown in FIG. 14 has the same fields as the reception print mode setting window shown in FIG. 7 (a description of these fields will be omitted since they have already been described), and those for page settings. A layout selection pull-down menu 852 as one of the fields for page settings is a button used to select a setting to lay out a plurality of pages of the received data on a single print sheet in a reduced scale. Options of this menu include "standard" that prints one page on one sheet, "2 in 1" that prints two pages on one sheet, and the like. Of course, this menu may include an option to separately print one page on a plurality of print sheets in an enlarged scale. When a two-sided print check box 853 is checked, a two-sided print mode is set.

The user may make general settings of the reception print mode using the reception print mode setting window shown in FIG. 14 in place of that shown in FIG. 7. Alternatively, the user may set a default reception print mode for each address upon registration in the address book using the reception print mode setting window shown in FIG. 14 in place of that shown in FIG. 13.

For example, assume that the following fact is known. That is, upon reception of data of a document according to a given format, if that data undergoes two-sided printing in a reduced scale in a toner save mode, a satisfactory output is obtained for that format. In this case, when "2 in 1" and "two-sided print" are set for the address of the transmission source which transmits data of that format, the consumption amounts of print sheets and toner can be saved.

Fourth Embodiment

Image processing according to the fourth embodiment of the present invention will be described below. Note that the same reference numerals in the fourth embodiment denote the same components as in the first to third embodiments, and a detailed description thereof will be omitted.

Figure 15:
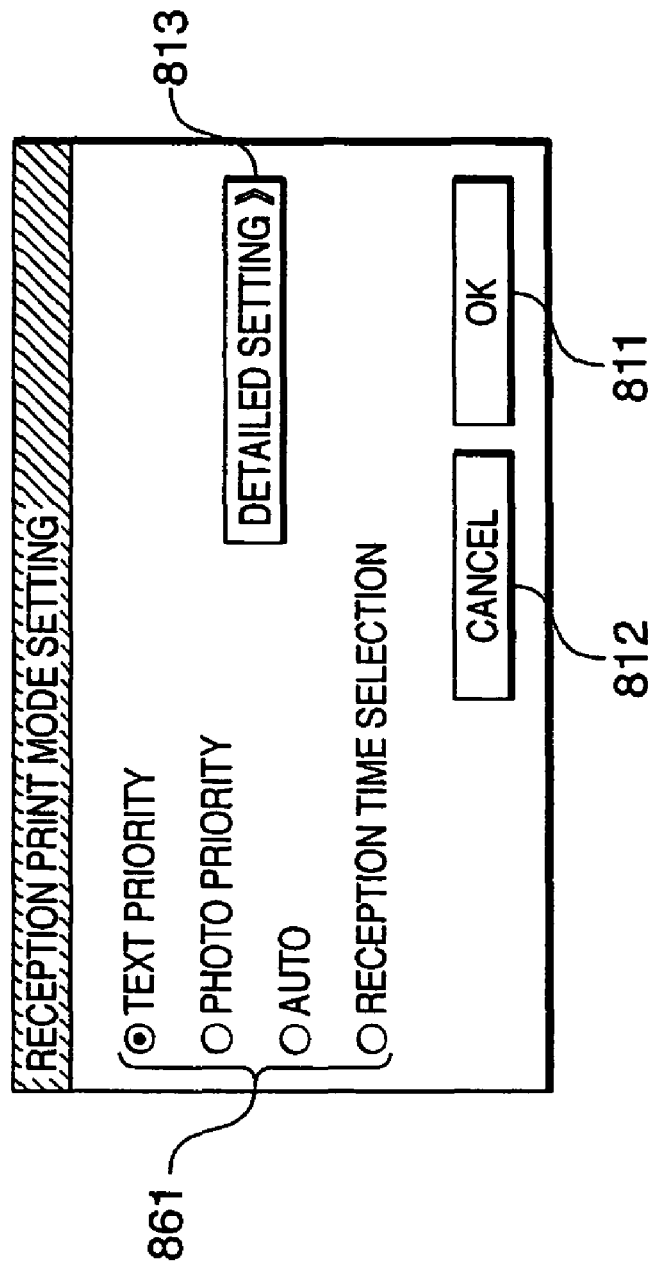
FIG. 15 shows a reception print mode setting window according to the fourth embodiment of the present invention.

FIG. 15 shows a reception print mode setting window in the fourth embodiment. The CPU 103 displays this window on the liquid crystal control panel 401.

On the window shown in FIG. 15, radio buttons 861 used to set the print image quality of received data include "selection upon reception". If "selection upon reception" is set, upon reception of data to be printed from outside the apparatus, the CPU 103 does not immediately start print processing, but displays a reception print window shown in FIG. 16 on the liquid crystal control panel 401, and prompts the user to set a print mode.

Figure 16:
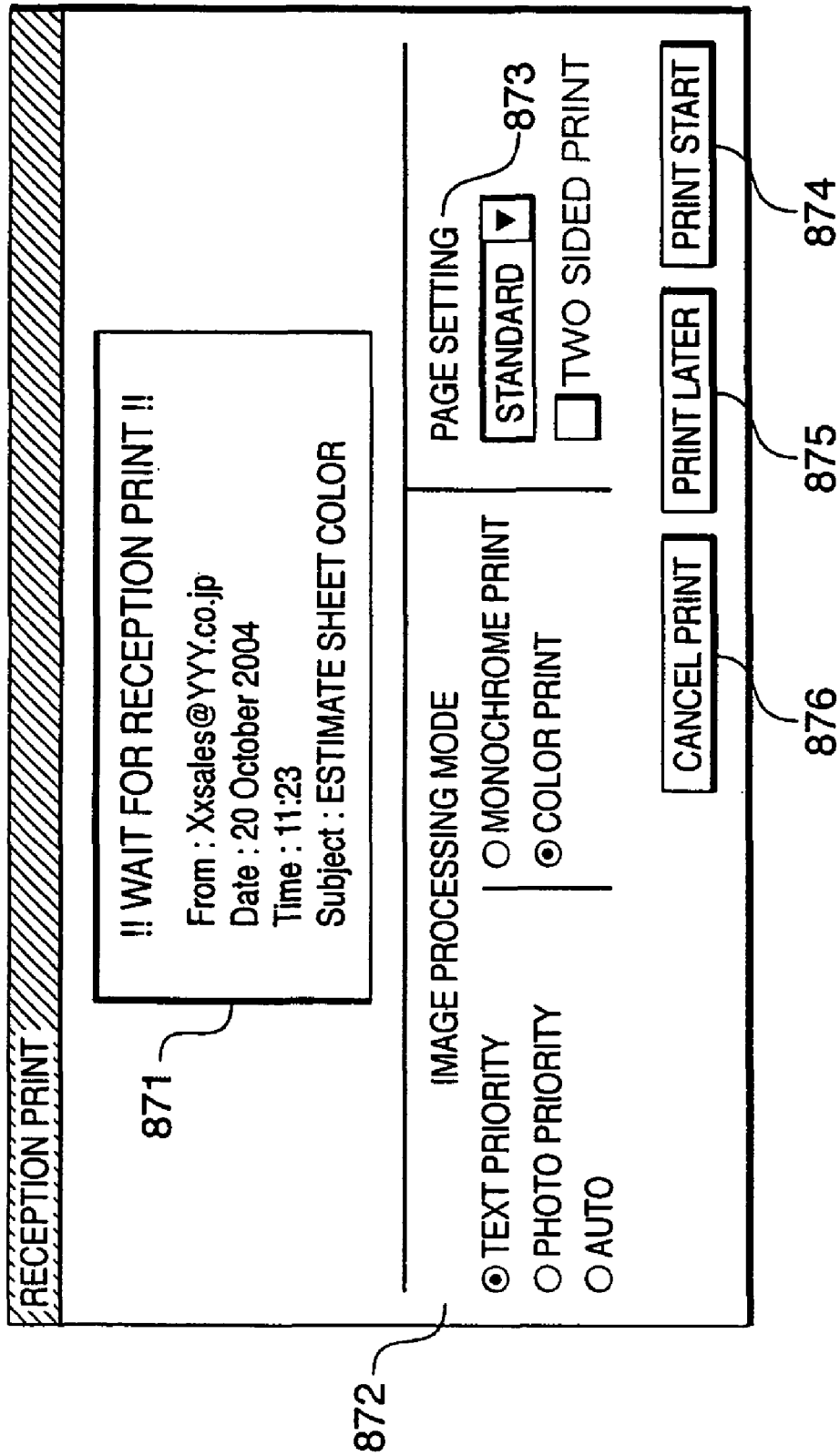
FIG. 16 shows a reception print window.

Referring to FIG. 16, a display area 871 of reception information displays a summary of received data (for example, in case of IFAX, the transmission source, date and time, title, and the like). The user can set one of character priority, photo priority, and auto using radio buttons in an image processing mode designation area 872, and can also set a monochrome or color print mode. Also, the user can set a layout such as "standard", "2 in 1", and the like described above and can also set a two-sided print mode in case of data including a plurality of pages, using a page setting area 873.

Furthermore, a "print start" button 874 is used to input a reception print start instruction under the conditions set on the reception print window. A "print later" button 875 is used to input an instruction to temporarily save the received data in, e.g., the HDD 109 without any settings associated with the reception print mode. A "cancel print" button 876 is used to cancel processing without printing the received data. When the received data is saved in the HDD 109, if the user calls the saved data by operating keys or buttons on the console 400, the CPU 103 displays the reception print window again, and it becomes ready to print. In this case, the CPU 103 displays a message "print saved data" or the like instead of a message example "wait for reception print" shown in FIG. 16 on the display area 871 of reception information, and indicates that the data is the saved received data.

When the user presses the "cancel print" button 876, the CPU 103 may erase the corresponding received data. However, the CPU 103 may save the received data as print rejected data in a predetermined area of the HDD 109. If the saving area of the print rejected data becomes full of data, the CPU 103 erases data in turn from those which have order reception dates and times. Also, as in the saved received data, the user can print the print rejected data remaining in the saving area by operating keys or buttons on the console 400.

Furthermore, a "display contents" button (not shown) may be provided on the reception print window to give a preview function of displaying the contents of the received data on the liquid crystal control panel 401 before a print instruction is generated. In this case, the user confirms a preview, and then can select "print start", "print later", or cancel "print".

According to the aforementioned embodiments, the user can easily set image processes and/or image processing parameters to be applied upon printing data received from outside the apparatus (especially, upon receiving and printing IFAX data or the like). Optimal image processes for printing for the user of combinations of image processes suited to the characteristics of the printer can be easily implemented by a simple setting operations. Furthermore, a mechanism that allows to set the image processes and/or image processing parameters in correspondence with the transmission sources and/or transmission protocols of data and the formats can be provided. In this way, since the user can freely select image processes upon printing for the transmission source, the required image quality of which can be predicted, identical image quality can always be expected for documents from the identical transmission source. Also, image quality for the identical transmission protocol and format can be uniformed, thus improving user's convenience on the receiving side. Furthermore, the present invention can be applied as output cost reduction means using the "2 in 1" print mode, two-sided print mode, and toner reduction print mode.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a flexible disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-099417, filed on Mar. 30, 2005, which is hereby incorporated by reference herein in its entirety.

What is claimed is:

1. An image processing apparatus comprising:
a receiver, arranged to receive image data;
a converter, arranged to convert the image data into raster data;
a processor, arranged to apply image processing for printing to the raster data in accordance with attribute information;
a controller, arranged to provide a reception-print mode which controls generation of the attribute information, and which controls the image processing applied to the raster data to be appropriate, by displaying a user interface on a monitor, wherein a user selectively sets a text-priority mode, a photograph-priority mode, or an automatic mode, as the reception-print mode using the user interface; and
a generator, arranged to generate the attribute information based on the received image data and the reception-print mode, wherein, when the automatic mode is set as the reception-print mode, said generator generates the attribute information in accordance with a compressed data format of the received image data such that the attribute information designating the image processing for text is generated when the compressed data format is MMR (Modified Modified READ), and the attribute information designating the image processing for photographs is generated when the compressed data format is JPEG (Joint Photographic Experts Group).

2. The apparatus according to claim 1, wherein said generator generates the attribute information preferentially using information described in a header of the received image data rather than the reception-print mode such that the attribute information designating the image processing for text is generated when information corresponding to black and white is described in the header, and the attribute information designating the image processing for photographs is generated when information corresponding to color is described in the header.

3. The apparatus according to claim 1, wherein when the received image data is page description language data, said generator generates the attribute information using information described in the page description language data without effect of the reception-print mode.

4. The apparatus according to claim 1, further comprising a register, arranged to register the reception-print mode for each transmission source of the image data.

5. An image processing method comprising the steps of:
receiving image data;
converting the image data into raster data;
applying image processing for printing to the raster data in accordance with attribute information;
setting a reception-print mode that controls generation of the attribute information, and that controls the image processing applied to the raster data to be appropriate, by displaying a user interface on a monitor, wherein a user selectively sets a text-priority mode, a photograph-priority mode, or an automatic mode as the reception-print mode using the user interface; and
generating the attribute information based on the received image data and the reception-print mode, wherein, when the automatic mode is set as the reception-print mode, the attribute information in accordance with a compressed data format of the received image data is generated such that the attribute information designating the image processing for text is generated when the compressed data format is MMR (Modified Modified READ), and the attribute information designating the image processing for photographs is generated when the compressed data format is JPEG (Joint Photographic Experts Group).

6. A non-transitory computer-readable storage medium storing a computer-executable program for causing a computer to perform an image processing method, the method comprising the steps of:
receiving image data;
converting the image data into raster data;
applying image processing for printing to the raster data in accordance with attribute information;
setting a reception-print mode that controls generation of the attribute information and that controls the image processing applied to the raster data to be appropriate, by displaying a user interface on a monitor, wherein a user selectively sets a text-priority mode, a photograph-priority mode, or an automatic mode as the reception-print mode using the user interface; and
generating the attribute information based on the received image data and the reception-print mode, wherein when the automatic mode is set as the reception-print mode, the attribute information in accordance with a compressed data format of the received image data is generated such that the attribute information designating the image processing for text is generated when the compressed data format is MMR (Modified Modified READ), and the attribute information designating the image processing for photographs is generated when the compressed data format is JPEG (Joint Photographic Experts Group.

* * * * *